US012793372B2

(12) United States Patent
Hosomi et al.

(10) Patent No.: US 12,793,372 B2
(45) Date of Patent: Nov. 10, 2026

(54) MOVING OBJECT CONTROL SYSTEM, INFORMATION PROCESSING APPARATUS, METHOD FOR A MOVING OBJECT CONTROL SYSTEM, METHOD FOR GENERATING ONE OR MORE MACHINE LEARNING MODELS

(71) Applicants: HONDA MOTOR CO., LTD., Tokyo (JP); KEIO UNIVERSITY, Tokyo (JP)

(72) Inventors: Naoki Hosomi, Wako (JP); Teruhisa Misu, San Jose, CA (US); Kentaro Yamada, Wako (JP); Shumpei Hatanaka, Yokohama (JP); Komei Sugiura, Yokohama (JP)

(73) Assignees: HONDA MOTOR CO., LTD., Tokyo (JP); KEIO UNIVERSITY, Tokyo (JP)

( * ) Notice: Subject to any disclaimer, the term of this patent is extended or adjusted under 35 U.S.C. 154(b) by 254 days.

(21) Appl. No.: 18/617,999

(22) Filed: Mar. 27, 2024

(65) Prior Publication Data

US 2025/0308190 A1 Oct. 2, 2025

(51) Int. Cl.

*G06V 10/00* (2022.01)
*G06T 7/50* (2017.01)
*G06V 10/25* (2022.01)
*G06V 10/44* (2022.01)
*G06V 10/80* (2022.01)

(52) U.S. Cl.

CPC ................ *G06V 10/25* (2022.01); *G06T 7/50* (2017.01); *G06V 10/44* (2022.01); *G06V 10/806* (2022.01)

(58) Field of Classification Search

CPC ...... G06V 10/25; G06V 10/44; G06V 10/806; G06V 10/945; G06V 10/70; G06V 20/56; G06V 20/58; G06V 10/764; G06T 7/50; G05D 2105/24; G05D 2109/10; G05D 1/2285

See application file for complete search history.

(56) References Cited

U.S. PATENT DOCUMENTS

2024/0029413 A1 * 1/2024 Piergiovanni ........ G06N 3/0464

FOREIGN PATENT DOCUMENTS

WO WO-2025056893 A1 * 3/2025 ............. G06T 17/00

OTHER PUBLICATIONS

Dogan et al, Using Depth for Improving Referring Expression Comprehension in Real-World Environments, arXiv: 2107.04658v1 (Jul. 9, 2021).*

Yang et al, LAVT: Language-Aware Vision Transformer for Referring Image Segmentation, CVPR (Year: 2022).*

(Continued)

*Primary Examiner* — Xiao Liu

(74) *Attorney, Agent, or Firm* — Thomas Horstemeyer, LLP

(57) ABSTRACT

A moving object control system performs to acquire an image and acquire a user instruction in a natural language including a relative positional relationship. The moving object control system predicts a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models.

6 Claims, 8 Drawing Sheets

(56) References Cited

OTHER PUBLICATIONS

Extended European Search Report for European Patent Application No. 25165544.5 dated Jul. 2, 2025.
Liu et al., Depth-Aware and Semantic Guided Relational Attention Network for Visual Question Answering, IEEE Transactions on Multimedia, IEEE, USA, vol. 25, Jul. 13, 2022, pp. 5344-5357, XP011952414, ISSN: 1520-9210, DOI: 10.1109/TMM.2022.3190686 [retrieved on Jul. 14, 2022].
Lee et al., From Big to Small: Multi-Scale Local Planar Guidance for Monocular Depth Estimation, arXiv.org, Sep. 23, 2021, XP093288130, Retrieved from the Internet: URL:https://arxiv.org/pdf/1907.10326.
Dogan et al., Using Depth for Improving Referring Expression Comprehension in Real-World Environments, arXiv:2107.04658v1, Jul. 9, 2021, https://arxiv.org/pdf/2107.04658.pdf.
Yang et al., LAVT: Language-Aware Vision Transformer for Referring Image Segmentation, pp. 18155-18165, https://openaccess.thecvf.com/content/CVPR2022/papers/Yang_LAVT_Language-Aware_Vision_Transformer_for_Referring_Image_Segmentation_CVPR_2022_paper.pdf.

* cited by examiner

MOVING OBJECT CONTROL SYSTEM, INFORMATION PROCESSING APPARATUS, METHOD FOR A MOVING OBJECT CONTROL SYSTEM, METHOD FOR GENERATING ONE OR MORE MACHINE LEARNING MODELS

BACKGROUND OF THE INVENTION

Field of the Invention

The present invention relates to a moving object control system, an information processing apparatus, a method for a moving object control system, and a method for generating machine learning models.

Description of the Related Art

In recent years, techniques for predicting a specific region in an image, such as referring image segmentation for predicting a region of a subject included in an image, and visual grounding for predicting a specific region in an image corresponding to an instruction given in a natural language, have been known.

A technique for recognizing a subject in an image highly related to utterance of a user in a natural language is disclosed in Fethiye Irmak Dogan et al., "Using Depth for Improving Referring Expression Comprehension in Real-World Environments", arXiv: 2107.04658v1 [cs.RO], [online], Jul. 9, 2021, searched on Jan. 18, 2024, Internet at arxiv.org/pdf/2107.04658.pdf. In this document, a clustering process is performed by combining a first heatmap indicating pixels in an RGB image highly related to utterance and a second heatmap indicating pixels in a depth image highly related to the utterance, thereby specifying the subject highly related to the utterance. A technique for improving accuracy in a task of referring image segmentation by fusing image features and language features by an attention mechanism is disclosed in Zhao Yang, and four others, "LAVT: Language-Aware Vision Transformer for Referring Image Segmentation", [online], searched on Jan. 18, 2024, Internet at openaccess.thecvf.com/content/CVPR2022/papers/Yang_LAVT_Language-Aware Vision Transformer for Referring Image Segmentation CVPR 2022 paper.pdf.

By the way, in a case where an instruction of a user includes a relative positional relationship with a target object, such as "front of the vehicle on the right", it is sometimes difficult to obtain sufficient accuracy even if language features are fused to image features of an RGB image.

SUMMARY OF THE INVENTION

The present invention has been made in view of the above problem, and an object thereof is to realize a technique capable of improving prediction accuracy in the case of predicting a region on an image corresponding to a user instruction including a relative positional relationship.

According to the present invention, it is provided a moving object control system comprising:

a memory; and one or more processors, wherein when instructions stored in the memory is executed by the one or more processors, the instructions cause the one or more processors to:

acquire an image;

acquire a user instruction in a natural language including a relative positional relationship; and predict a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models.

Furthermore, according to the present invention, it is provided a moving object control system comprising one or more processors configured to execute processing of one or more machine learning models, wherein the one or more machine learning models include a first machine learning model that extracts, from an acquired image, an image feature indicating a feature of a scene captured in the image, a second machine learning model that predicts, from the image, a depth of the scene captured in the image, a third machine learning model that extracts a language feature indicating a linguistic feature for a user instruction in a natural language including a relative positional relationship, and a fourth machine learning model that predicts a region in the image corresponding to a position in the scene indicated by the user instruction based on a fused feature obtained by fusing the image feature, the depth, and the language feature.

In addition, according to the present invention, it is provided an information processing apparatus configured to cause one or more machine learning models to be trained, the information processing apparatus comprising:

a memory; and one or more processors, wherein when instructions stored in the memory is executed by the one or more processors, the instructions cause the one or more processors to perform:

acquiring an image, a user instruction in a natural language including a relative positional relationship, and correct answer data indicating a region in the image indicated by the user instruction;

predicting a region, indicated by the user instruction, in the image corresponding to a position in a scene captured in the image based on the image and the user instruction by using the one or more machine learning models; and causing the one or more machine learning models to be trained by using a loss function based on a difference between the predicted region in the image and the region in the image indicated by the correct answer data, and the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction.

Still according to the present invention, it is provided a method executed in a moving object control system, the method comprising:

acquiring an image;

acquiring a user instruction in a natural language including a relative positional relationship; and predicting a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models.

Furthermore, according to the present invention, it is provided a method executed in a moving object control system, the method comprising:

acquiring an image;

acquiring a user instruction in a natural language including a relative positional relationship; and predicting a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models.

Still according to the present invention, it is provided a method for generating one or more machine learning models, the method being executed in an information processing apparatus, the method comprising:

acquiring an image, a user instruction in a natural language including a relative positional relationship, and correct answer data indicating a region in the image indicated by the user instruction;

predicting a region, indicated by the user instruction, in the image corresponding to a position in a scene captured in the image based on the image and the user instruction by using the one or more machine learning models; and causing the one or more machine learning models to be trained by using a loss function based on a difference between the predicted region in the image and the region in the image indicated by the user instruction indicated by the correct answer data, wherein the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction.

According to the present invention, the prediction accuracy can be improved in the case of predicting the region on the image corresponding to the user instruction including the relative positional relationship.

DESCRIPTION OF THE EMBODIMENTS

Figure 1A:
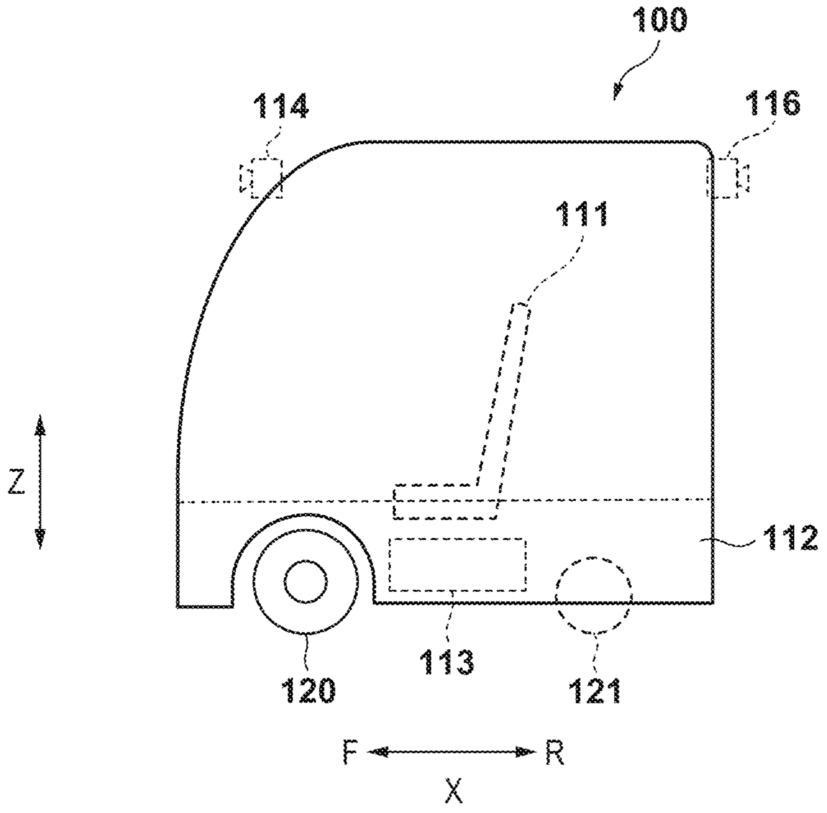
FIG. 1A is a diagram (1) illustrating a configuration example of a moving object according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiment, a case where a model of a neural network as a machine learning model to be described later is executed in a moving object, which is an example of a moving object control system, such as a micro mobility vehicle in an inference stage and a learning stage will be described as an example. However, the present embodiment is not limited to this example, and processing of the learning stage may be executed in an information processing server, which is an example of the information processing apparatus, disposed on a cloud or Edge. In addition, the moving object control system may be a moving object, a control device such as an ECU included in the moving object, or an information processing server on a cloud, the information processing server being configured to control the moving object. That is, processing of the inference stage of the machine learning model according to the present embodiment may be executed in the moving object or may be executed in the information processing server on the cloud. In addition, the moving object is not limited to the micro mobility vehicle, and may include a robot capable of autonomous traveling, a four-wheeled or two-wheeled passenger vehicle, a work vehicle, and the like.

In the following embodiment, as an example of a moving object that is a micro mobility vehicle, an ultra-compact electric vehicle having a riding capacity of one person or so will be described as an example. However, the micro mobility vehicles may include any vehicle that travels carrying baggage along with a person, instead of carrying the person. In addition, the present embodiment is not limited to the example in which the moving object is an electric vehicle, and is applicable to any moving object other than the electric vehicle.

A moving object 100 according to the present embodiment recognizes a traveling region and generates a route by using an image captured by the moving object itself without using a highly accurate map, and autonomously travels in accordance with the generated route. In this situation, the moving object 100 according to the present embodiment, for example, executes the machine learning model that appropriately predicts a region on an image corresponding to a position designated by utterance in order to appropriately move to a place designated by a user by the utterance.

<Configuration of Moving Object>

Figure 1B:
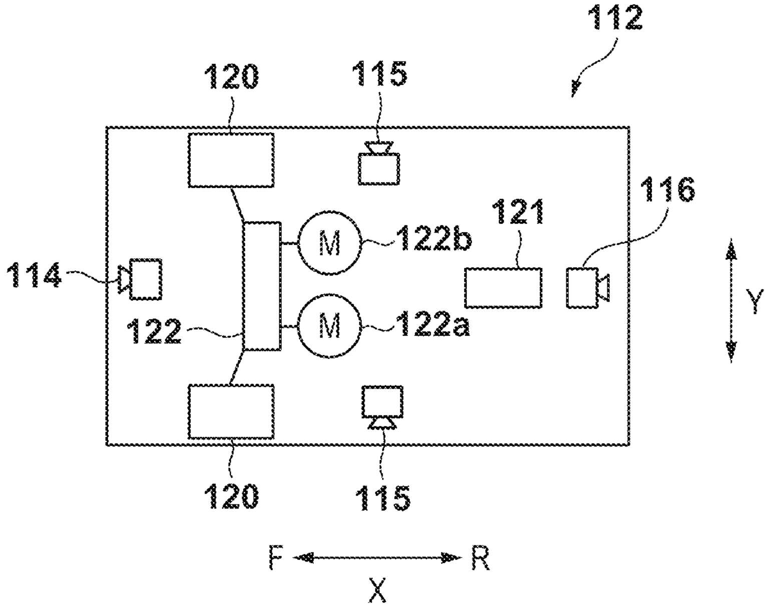
FIG. 1B is a diagram (2) illustrating a configuration example of the moving object according to the embodiment.

A configuration example of the moving object 100 will be described with reference to FIGS. 1A and 1B. FIG. 1A illustrates a side view of the moving object 100 according to the present embodiment, and FIG. 1B illustrates an internal configuration of the moving object 100. In the drawings, an arrow X indicates a front-and-rear direction of the moving object 100, and F indicates the front, and R indicates the rear. Arrows Y and Z respectively indicate a width direction (a left-and-right direction) and an up-and-down direction of the moving object 100.

The moving object 100 is an electric autonomous vehicle including a traveling unit 112 and using a battery 113 as a main power supply. The battery 113 is, for example, a secondary battery such as a lithium ion battery, and the moving object 100 autonomously travels on the traveling unit 112 with electric power supplied from the battery 113. The traveling unit 112 includes a pair of left and right drive wheels 120, which are front wheels, and one driven wheel 121, which is a rear wheel. Note that the example of the traveling unit 112 illustrated in FIG. 1A is an example, and the traveling unit 112 may be in another form such as a form of a four-wheeled vehicle. In addition, the rear wheel is not limited to the driven wheel, and may be driven by a drive mechanism. The moving object 100 includes, for example, a seat 111 for one person, but may include a plurality of seats.

The traveling unit 112 includes a drive mechanism 122. The drive mechanism 122 is a mechanism that rotates the corresponding drive wheels 120 with motors 122*a* and 122*b* as drive sources. By rotating each of the drive wheels 120, the drive mechanism 122 is capable of moving the moving object 100 forward or backward. In addition, by making a difference in rotation between the motors 122*a* and 122*b*, the drive mechanism 122 is also capable of changing an advancing direction of the moving object 100. The driven wheel 121 is capable of making a turn with the Z direction as a rotation axis.

The moving object 100 includes detection units 114 to 116, each of which detects a target object in the surroundings of the moving object 100. The detection units 114 to 116 are an external sensor group that monitors the periphery of the moving object 100. In the case of the present embodiment, each of the detection units 114 to 116 is an imaging device that captures an image in the surroundings of the moving object 100, and includes, for example, an optical system such as a lens and an image sensor. However, when depth information to be described later is acquired, a radar or a light detection and ranging (LIDAR) may be adopted in addition to the imaging device.

For example, as the detection unit 114, one imaging device is disposed in a front portion of the moving object 100 to be mainly used for acquiring a captured image on a forward side of the moving object 100. Note that two imaging devices may be disposed apart from each other in the Y direction as the detection unit 114. The detection units 115 are respectively disposed on a left portion and a right portion of the moving object 100, and are mainly used for acquiring captured images on lateral sides of the moving object 100. The detection unit 116 is disposed in a rear portion of the moving object 100, and is mainly used for acquiring a captured image on a backward side of the moving object 100. Note that the moving object 100 does not have to include the detection units 115 and 116.

<Configuration Example of Control System of Moving Object>

Figure 2:
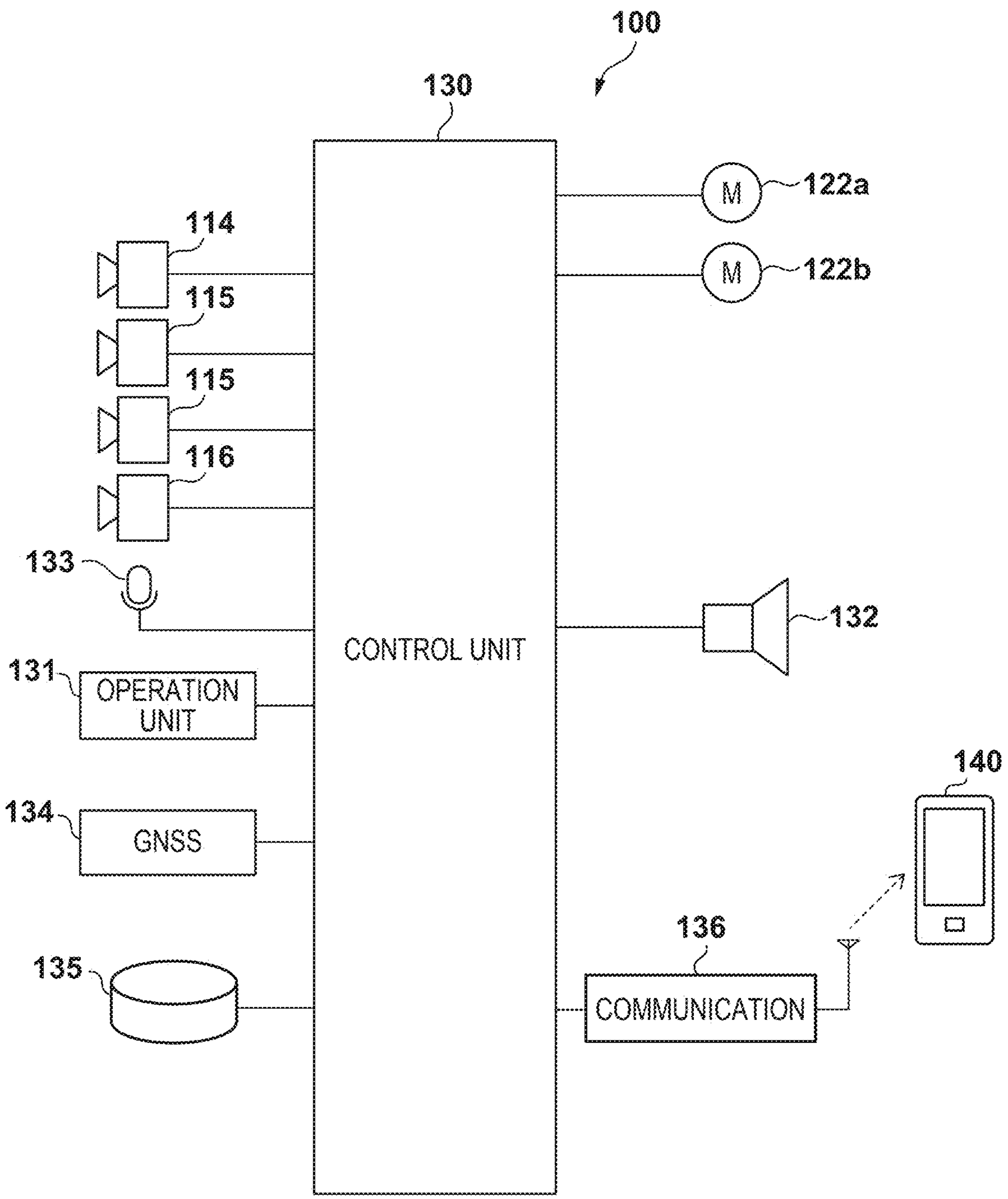
FIG. 2 is a block diagram illustrating a configuration example of a control system of the moving object according to the embodiment.

FIG. 2 is a block diagram of a control system of the moving object 100. The moving object 100 includes a control unit (ECU) 130. The control unit 130 includes one or more processors including a CPU or a GPU, a memory device of a semiconductor memory or the like, an interface with an external device, and the like. The memory device stores a program to be executed by the processor and various types of data (for example, weighting parameters of the trained machine learning model) for use in processing performed by the processor. A plurality of sets of the processor, the memory device, and the interface may be provided for an individual function of the moving object 100 to be capable of communicating with each other.

The control unit 130 acquires outputs (for example, images) from the detection units 114 to 116, input information into an operation unit 131, voice information that has been input from a voice input device 133, and the like, and executes various types of processing. The control unit 130 performs, for example, control of the motors 122*a* and 122*b* (travel control of the traveling unit 112) and display control of a display panel included in the operation unit 131, gives a notification to an occupant of the moving object 100 by voice, and outputs information. In addition, as will be described later, the control unit 130 receives an instruction of the user in a natural language such as "front of the vehicle on the right", and executes processing (region prediction processing) of predicting a region in an image corresponding to a position designated by the instruction. The region prediction processing can be executed by use of one or more machine learning models (for example, deep neural networks).

The voice input device 133 includes, for example, a microphone, and collects voice, such as utterance, of the occupant (user) of the moving object 100. A global navigation satellite system (GNSS) sensor 134 receives a GNSS signal, and detects a current position of the moving object 100.

A storage device 135 includes a nonvolatile recording medium that stores various pieces of data. The storage device 135 may also store the program to be executed by the processor, data for use in the processing by the processor, and the like. The storage device 135 may store various parameters (for example, trained weighting parameters or hyperparameters of a deep neural network, or the like) of the machine learning model executed by the control unit 130.

A communication device 136 is a communication device capable of communicating with an external device (for example, a communication terminal 140 owned by the user or an information processing server) via wireless communication, such as Wi-Fi or 5th generation mobile communication.

<Functional Configuration Example of Control Unit>

Figure 3:
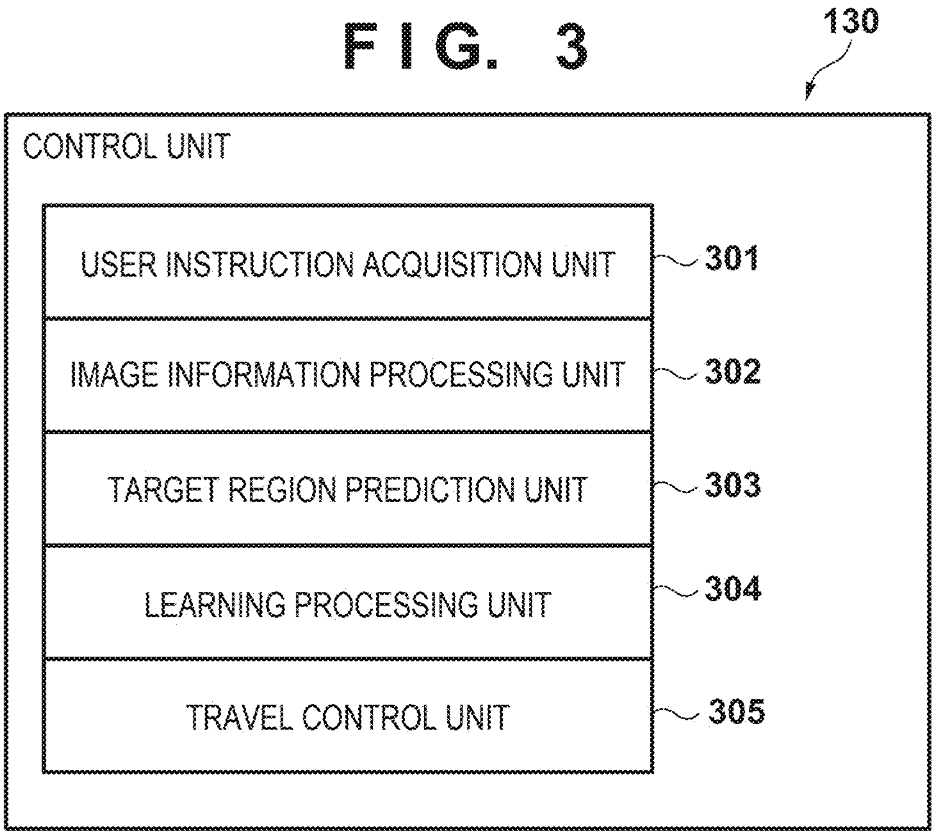
FIG. 3 is a diagram illustrating a functional configuration example of a control unit 130 according to the embodiment.

Next, a functional configuration example of the control unit 130 according to the present embodiment will be described with reference to FIG. 3. The function of each unit of the control unit 130 illustrated in FIG. 3 is realized, for example, as one or more processors of the control unit 130 executes the program stored in the memory or the like. Note that the example illustrated in FIG. 3 illustrates a case where the control unit 130 includes both a target region prediction unit 303 and a learning processing unit 304. That is, the example illustrated in FIG. 3 illustrates a case where the control unit 130 can execute both processing of an inference stage with the trained machine learning model and processing of a learning stage for learning the machine learning model. However, in a case where the control unit 130 performs only the processing of the inference stage with the trained machine learning model, the control unit 130 does not have to include the learning processing unit 304. In this case, the processing of the learning stage for learning the machine learning model is executed in another device.

When the processing of the inference stage is performed, an instruction acquisition unit 301 acquires a user instruction input via the operation unit 131 or the voice input device 133. A user instruction by voice input via the voice input device 133 may be converted into an uttered sentence described in the natural language by voice recognition, or may be acquired as voice information including utterance in the natural language. In addition, the user instruction may be a text described in the natural language input via the operation unit 131. In any aspect, the user instruction is acquired as language information including designation of a position in the natural language. The designation of the position includes a relative positional relationship with a target object, for example, "front of the vehicle on the right". When the processing of the learning stage is performed, the instruction acquisition unit 301 acquires a user instruction included in training data to be described later.

When the processing of the inference stage is performed, the image information acquisition unit 302 acquires outputs (images) of the detection units 114 to 116. When the processing of the learning stage is performed, the image information acquisition unit 302 acquires an image included in the training data to be described later.

The target region prediction unit 303 uses the language information designating a place and acquired from the instruction acquisition unit 301 and the image acquired from the image information acquisition unit 302 to execute the region prediction processing using the machine learning model. The machine learning model may be configured by one or more machine learning models. When the processing of the inference stage is performed, the target region prediction unit 303 is executed by using parameters of the trained machine learning model (for example, weighting parameters of an optimized neural network).

Note that the control unit 130 can recognize a position and a shape of an obstacle, a traveling region, and the like, by using image information, in addition to the processing performed by the target region prediction unit 303. A position and a shape of an obstacle, and a traveling region, a road structure, and the like on the forward side of the moving object 100 may be recognized by, for example, applying a pre-trained machine learning model for image recognition (which is different from the model for use in the region prediction processing) to the image obtained from the detection unit 114.

The learning processing unit 304 causes the machine learning model for use in the target region prediction unit 303 to be trained and generates the trained machine learning model. The learning processing unit 304 calculates a value of a loss function based on a difference between a prediction result by the target region prediction unit 303 and correct answer data for the prediction result. At this time, the machine learning model of the target region prediction unit 303 outputs the prediction result by using the parameters (for example, the weighting parameters of the neural network) of the machine learning model at a stage in the middle of learning. The learning processing unit 304 changes the parameters of the machine learning model so as to reduce the value of the loss function. The learning processing unit 304 controls the processing of the learning stage so as to repeat prediction by the target region prediction unit 303, calculation of the value of the loss function, and change of the parameters of the machine learning model by using the training data.

The training data includes a plurality of data sets each including a set of an image, a user instruction including designation of a position in the image in the natural language, and correct answer data indicating a region in the image. The user instructions in the correct answer data include various instructions indicating relative positional relationships with various target objects, such as "front of the vehicle on the right". The relative positional relationships included in the correct answer data include various expressions representing an up-and-down direction or a left-and-right direction in an image plane. In addition, the relative positional relationships included in the correct answer data include various expressions representing a near side or a far side with respect to the image plane. Further, the target objects included in the and serve as base points of relative positions also include various target objects. Such target objects include, for example, various expressions representing movable target objects such as a pedestrian, a bicycle, a vehicle, and a robot, disposed target object such as a tree, a building, a traffic light, a vending machine, and a post, a road, an intersection, and the like. The images included in the training data include images obtained by capturing various target objects corresponding to user instructions in various states.

A travel control unit 305 determines a traveling route to the position corresponding to the instruction based on the region in the image corresponding to the instruction that has been predicted by the target region prediction unit 303 and the traveling region recognized using the image information, and determines a control amount of the moving object in accordance with the determined traveling route. For example, in a case where the user gives an instruction "stop in front of the vehicle on the right", the target region prediction unit 303 predicts a position corresponding to "front of the vehicle on the right", and determines a traveling route to the position and causes movement. Note that the user instruction does not have to be an instruction to stop the moving object 100. For example, the instruction may be "proceed to the front of the vehicle on the right", and in this case, it is sufficient to perform movement toward a position corresponding to "front of the vehicle on the right". In any case, the travel control unit 305 is executed only when the target region prediction unit 303 performs the processing of the inference stage. A method for determining a traveling route with a region in an image as a target region may be any method, and a known method may be used. The travel control unit 305 further controls traveling of the moving object 100 (for example, controls the motors **122*a* and 122*b***) in accordance with the determined control amount.

<Operation of Machine Learning Model for Use in Region Prediction Processing>

Figure 4:
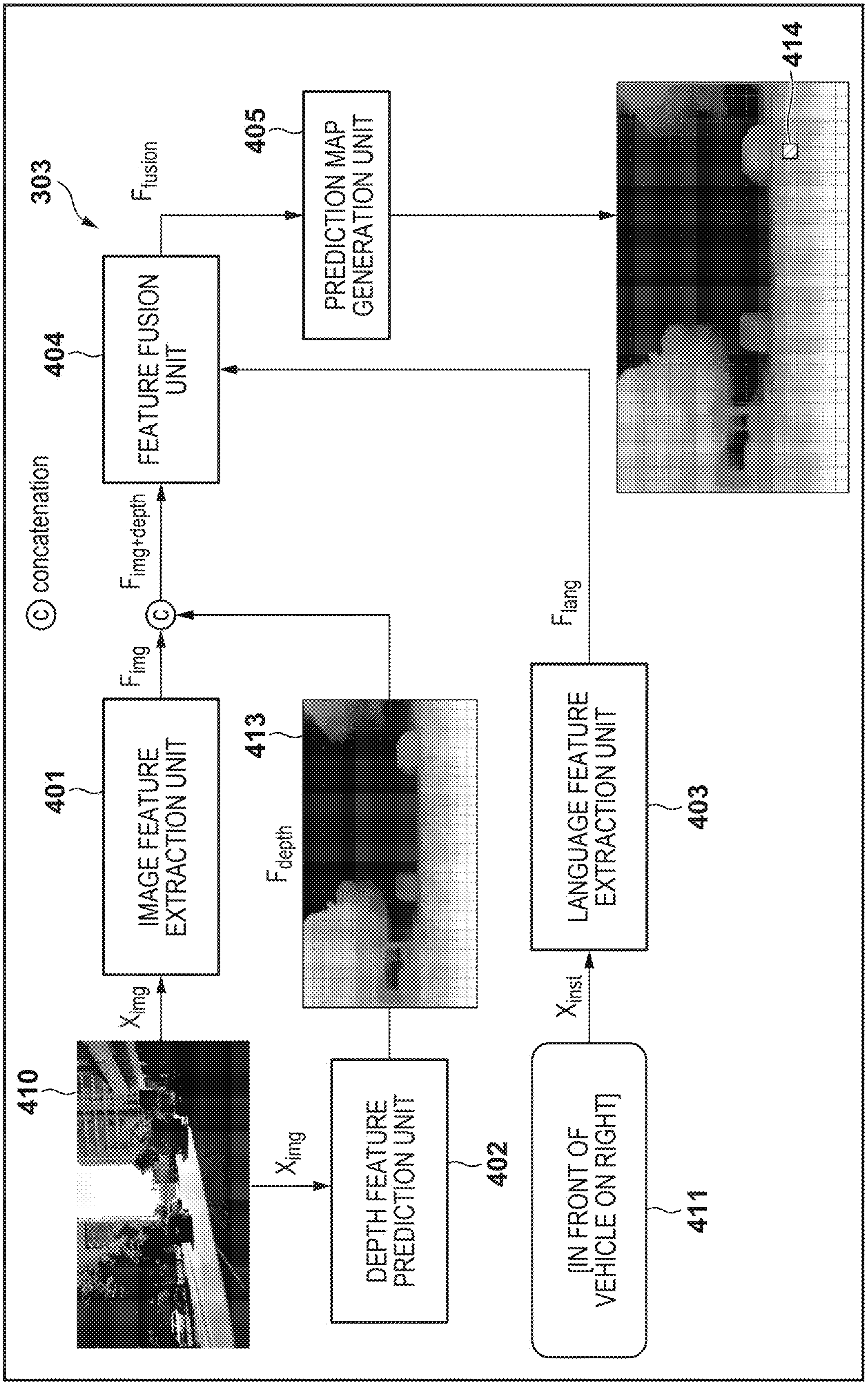
FIG. 4 is a diagram for describing a configuration of a target region prediction unit according to the embodiment.

The machine learning model for use in the region prediction processing according to the present embodiment will be described with reference to FIG. 4.

An image 410 is an image ($X_{img}$) acquired by the image information acquisition unit 302, and is a captured image or an image included in the training data. An image feature extraction unit 401 inputs the image 410 to the machine learning model and extracts an image feature of a scene captured in the image. The image feature may be, for example, an image feature for each channel of RGB. The image feature extraction unit 401 can extract the image feature by, for example, convolution or pooling processing, but the image feature extraction unit 401 may extract the image feature by another configuration, for example, a transformer or the like. For example, the image feature extraction unit 401 outputs a feature map ($F_{img}$) in which the image feature is associated with each predetermined unit region (each region of H×W pixels) of the image 410. Note that, when the unit region is 1×1 pixel, the feature map is a map of resolution of the input image (that is, has a feature for each pixel).

A depth feature prediction unit 402 inputs the image 410 to the machine learning model and predicts a depth of the scene, captured in the image, from an imaging device. The machine learning model may be, for example, a known machine learning model capable of predicting the depth from one image. The depth feature prediction unit 402 outputs a feature of the depth encoded from the image 410 and then decoded by the machine learning model, for example, as a depth map ($F_{depth}$) in which the depth is associated with each predetermined unit region (each region of H×W pixels) of the image 410. A depth image 413 illustrated in FIG. 4 illustrates a state in which a depth image of resolution of the image 410 is divided into a grid corresponding to the unit regions for the purpose of easy understanding of the depth map. Note that, when the unit region is 1×1 pixel, the depth map is a map of resolution of the input image.

Since the feature map $F_{img}$ of the image and the depth map $F_{depth}$ have the feature and the depth, respectively, for each predetermined unit region, the target region prediction unit 303 can concatenate the feature map $F_{img}$ of the image and the depth map $F_{depth}$ as a two-dimensional map having the same size. The target region prediction unit 303 concatenates the feature map $F_{img}$ of the image and the depth map $F_{depth}$ to generate a concatenated map $F_{img+depth}$.

A user instruction 411 is language information acquired by the instruction acquisition unit 301, and is language information from the voice input device 133 or the operation unit 131 or language information included in the training data. The user instruction 411 includes designation of a position in the natural language including a relative positional relationship, for example, "front of the vehicle on the right", and indicates a position in the captured scene. In addition, the designated position in the scene corresponds to a specific region in the image.

A language feature extraction unit 403 may include, for example, a machine learning model using a transformer such as BERT or a recursive machine learning model such as an LSTM or a GRU. The language feature extraction unit 403 extracts a linguistic feature (language feature $F_{lang}$) included in the user instruction 411. The language feature may be encoded into, for example, a vector representation used in word embedding.

The feature fusion unit 404 fuses the features (concatenated map) $F_{img+depth}$ in which the feature of the image and the depth are concatenated and the language feature $F_{lang}$ extracted by the language feature extraction unit 403, thereby generating a fused feature. The feature fusion unit 404 can generate the fused feature by any configuration. The feature fusion unit 404 may include, for example, a pixel-word attention module (PWAM). For example, the PWAM inputs the concatenated map ($F_{img+depth}$) as a query of an attention mechanism and inputs the language feature as a key and a value of the attention mechanism, thereby generating a fused feature ($F_{fusion}$) in which the language feature is fused to each unit region of the concatenated feature. In this manner, the language feature is fused (associated) with the features for each unit region in the concatenated map, and thus, it is possible to specify the feature on the image and the depth, which are highly correlated with the language feature. That is, it is possible to perform highly accurate prediction in consideration of a relationship among the feature on the image, the depth, and the language feature. In a case where the user instruction includes the relative positional relationship such as "front of the vehicle on the right", a region of an image corresponding to a position indicated by "front of the vehicle" can be predicted in consideration of both the image feature and the depth, and thus, prediction accuracy for the user instruction can be improved.

A prediction map generation unit 405 inputs the fused feature generated by the feature fusion unit 404 to the machine learning model and predicts the region in the image corresponding to the position in the scene indicated by the user instruction.

The machine learning model of the prediction map generation unit 405 can be, for example, a decoder configured by a transformer. This decoder receives the input of the fused feature and outputs a prediction map indicating a probability of being the position in the scene indicated by the user instruction for each region.

Alternatively, the machine learning model of the prediction map generation unit 405 may further include an encoder configured by a transformer. This encoder is, for example, an encoder that receives the input of the fused feature and further encodes the fused feature. That is, a feature effective for a task (of predicting the designated position) is further extracted from the fused feature. Then, the encoded feature is decoded by the above-described decoder of the transformer, thereby outputting the prediction map indicating the probability of being the position in the scene indicated by the user instruction for each region. In the example illustrated in FIG. 4, the prediction map output by the prediction map generation unit 405 is superimposed on the depth image 413 for the sake of description. A region indicating the highest probability on the prediction map is, for example, a region 414. Note that the machine learning model included in the prediction map generation unit 405 may be configured by a model other than the transformer.

Figure 5:
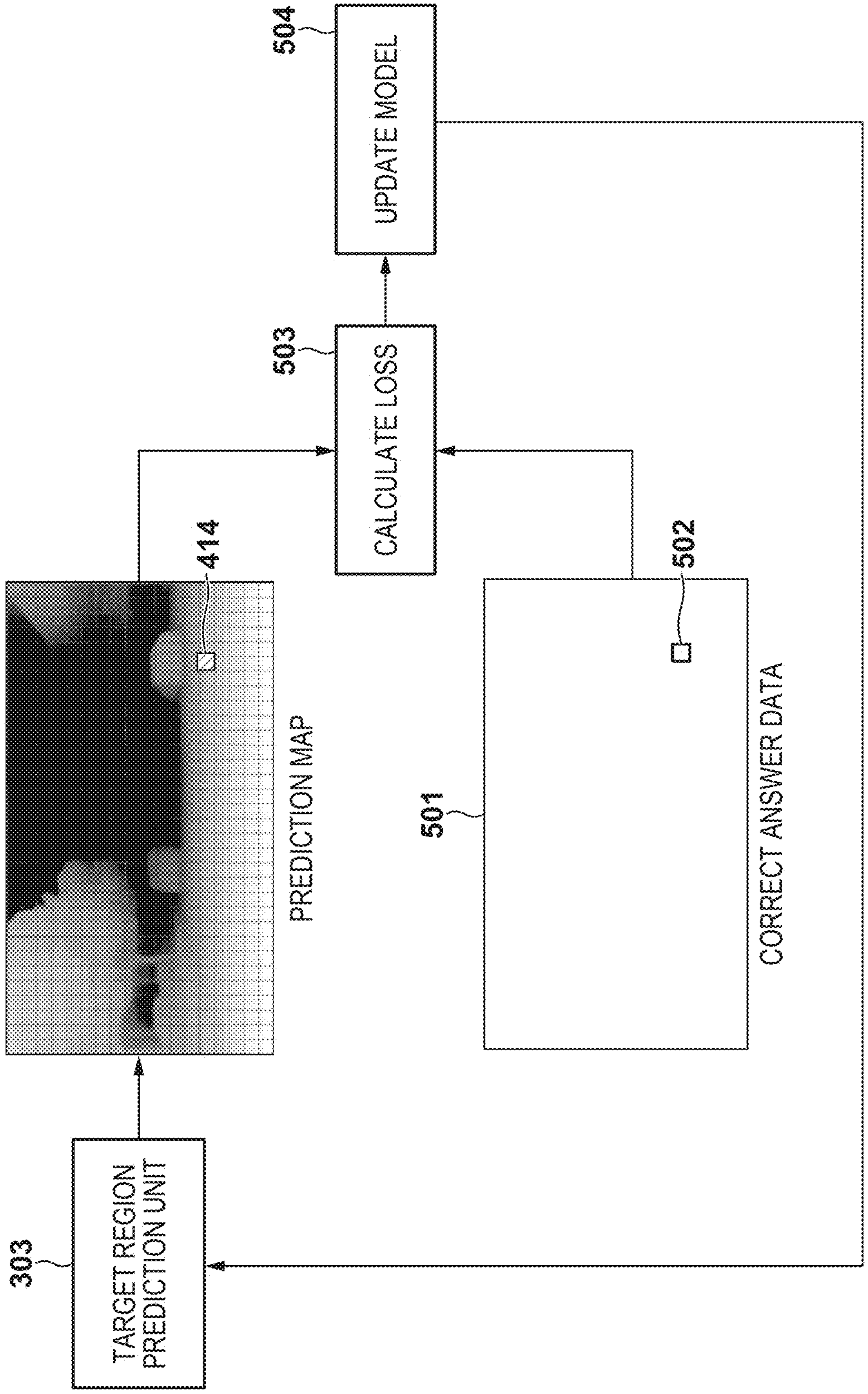
FIG. 5 is a diagram for describing processing of causing a machine learning model of the target region prediction unit to be trained according to the embodiment.

Next, processing of causing the machine learning model of the target region prediction unit 303 to be trained will be described with reference to FIG. 5. The processing of the learning stage illustrated in FIG. 5 is executed by the learning processing unit 304. The machine learning model of the target region prediction unit 303 outputs the prediction map by using parameters currently set in the learning stage. Note that the machine learning model of the target region prediction unit 303 receives inputs of the image and the user instruction included in the training data and executes processing. Although the prediction map includes the probability in each unit region, the example illustrated in FIG. 5 illustrates only the region 414 having the highest probability for the sake of description. The learning processing unit 304 calculates a loss based on a difference between a prediction result in the prediction map and the region in the image indicated by the correct answer data by using the loss function (processing 503). As the loss function, various functions can be used as long as the above difference is used, and for example, a binary cross-entropy loss for obtaining a loss in two-class classification may be used. The correct answer data can be, for example, binary image data in which a region 502 as a correct answer on the map is "1" and the other regions are "0". In the learning processing unit 304, the learning processing unit 304 updates the parameters of the machine learning model of the target region prediction unit 303 such that a value of the loss function decreases (processing 504). The learning processing unit 304 repeatedly executes the processing by the target region prediction unit 303, the processing 503, and the processing 504 such that the value of the loss function becomes sufficiently small (for example, is minimized), thereby causing the machine learning model to be trained.

<Series of Operations of Causing Models for Use in Region Prediction Processing to be Trained>

Figure 6:
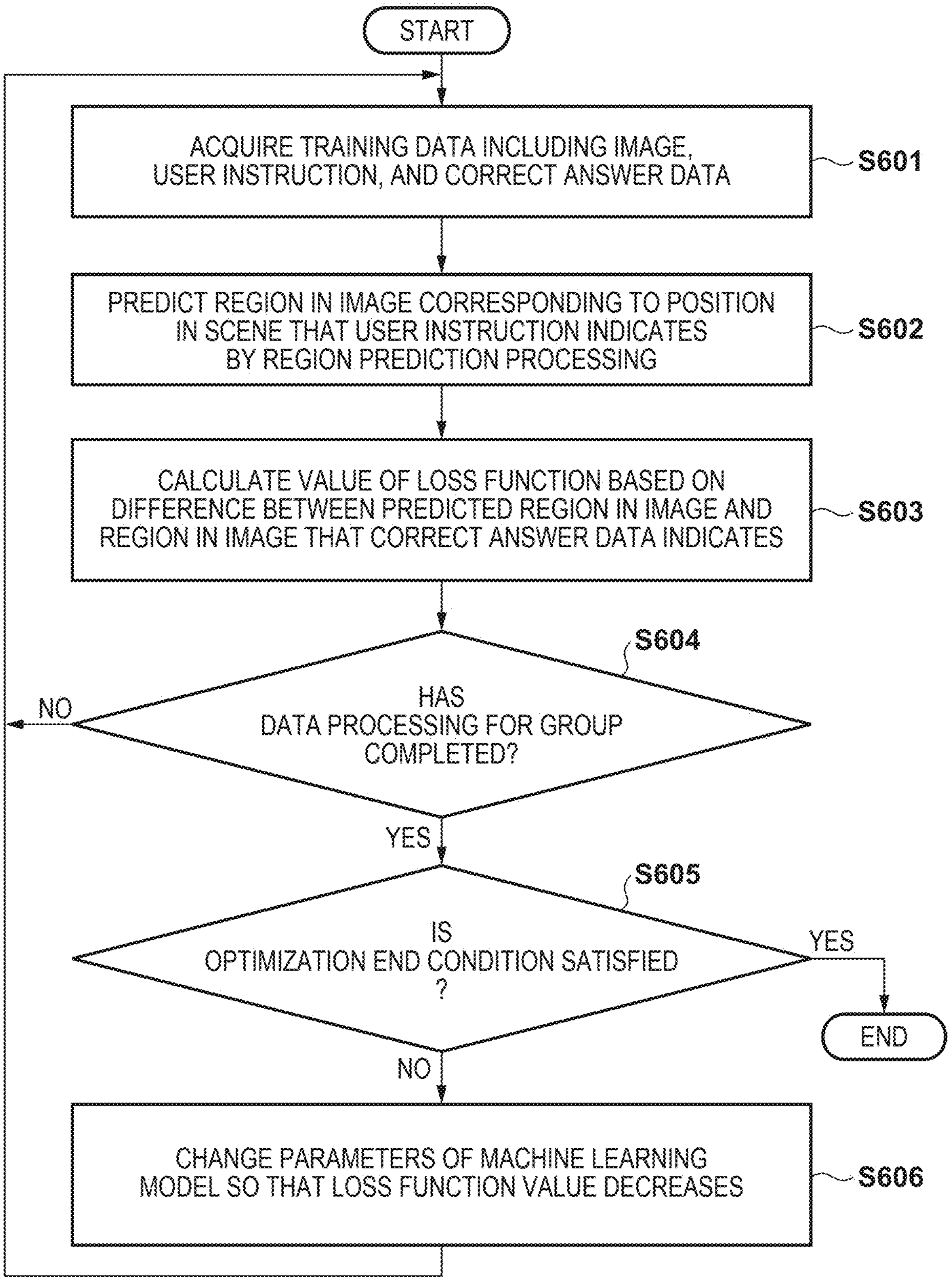
FIG. 6 is a flowchart illustrating a series of operations of causing the machine learning model for use in region prediction processing to be trained according to the embodiment.

Next, a series of operations of causing the machine learning model for use in the region prediction processing to be trained will be described with reference to FIG. 6. Note that this processing is realized as the control unit 130 develops and executes the program stored in the storage device 135 on the memory device of the control unit 130. Note that, in a case where the control unit 130 does not include the learning processing unit 304, the following processing may be realized, for example, as one or more processors in the information processing server, which is separate from the moving object 100, executes the program. In this case, the information processing server executes the program by the one or more processors to realize operations of the instruction acquisition unit 301, the image information acquisition unit 302, the target region prediction unit 303, and the learning processing unit 304.

In S601, for example, the instruction acquisition unit 301 and the image information acquisition unit 302 acquire language information of training data (that is, information including a user instruction in a natural language) and an image of the training data, respectively. In addition, the learning processing unit 304 acquires correct answer data (for example, a map indicating a specific region in an image) corresponding to the training data.

In S602, the target region prediction unit 303 performs the region prediction processing to predict a region in the image corresponding to a position in a scene indicated by the user instruction. The region prediction processing is realized by the machine learning model (the image feature extraction unit 401, the depth feature prediction unit 402, the language feature extraction unit 403, the feature fusion unit 404, and the prediction map generation unit 405) as described above. Details of this step will be described later.

In S603, the learning processing unit 304 calculates a value of a loss function based on a difference between the predicted region in the image and the region in the image in the correct answer data as described above. When calculating the value of the loss function, the learning processing unit 304 may calculate the difference between the predicted region in the image and the region in the image indicated by the correct answer data only in a lower half region of the region of the image. The reason why the lower half of the region of the image is set is that a target position is often the lower half of the region of the image in a case where the user gives an instruction about a stop position to the moving object. In this case, it is possible to speed up the processing by limiting the target for calculating the loss function.

In S604, the learning processing unit 304 determines whether the processing has been completed for a group of data in the training data. When determining that the processing has not been completed for the group of data, the learning processing unit 304 returns the processing to S601 and repeats calculation of the value of the loss function using other data. When the learning processing unit 304 determines that the processing has been completed for the group of data, the processing proceeds to S605.

In S605, the learning processing unit 304 determines whether an end condition for optimization is satisfied. A condition for optimization processing may be any condition, but may include repetition of a predetermined iteration, a decrease in the value of the loss function to a predetermined value or less, and the like. When the learning processing unit 304 determines that the end condition for optimization is satisfied, this series of operations is ended, and otherwise, the processing proceeds to S606.

In S606, the learning processing unit 304 changes parameters of one or more machine learning models (for example, based on a calculation result of back propagation) such that the value of the loss function decreases. Thereafter, the learning processing unit 304 returns the processing to S601.

In this manner, it is possible to generate the machine learning model that improves the prediction accuracy in the case of predicting the specific region in the image corresponding to the user instruction.

<Series of Operations in Region Prediction Processing>

Figure 7:
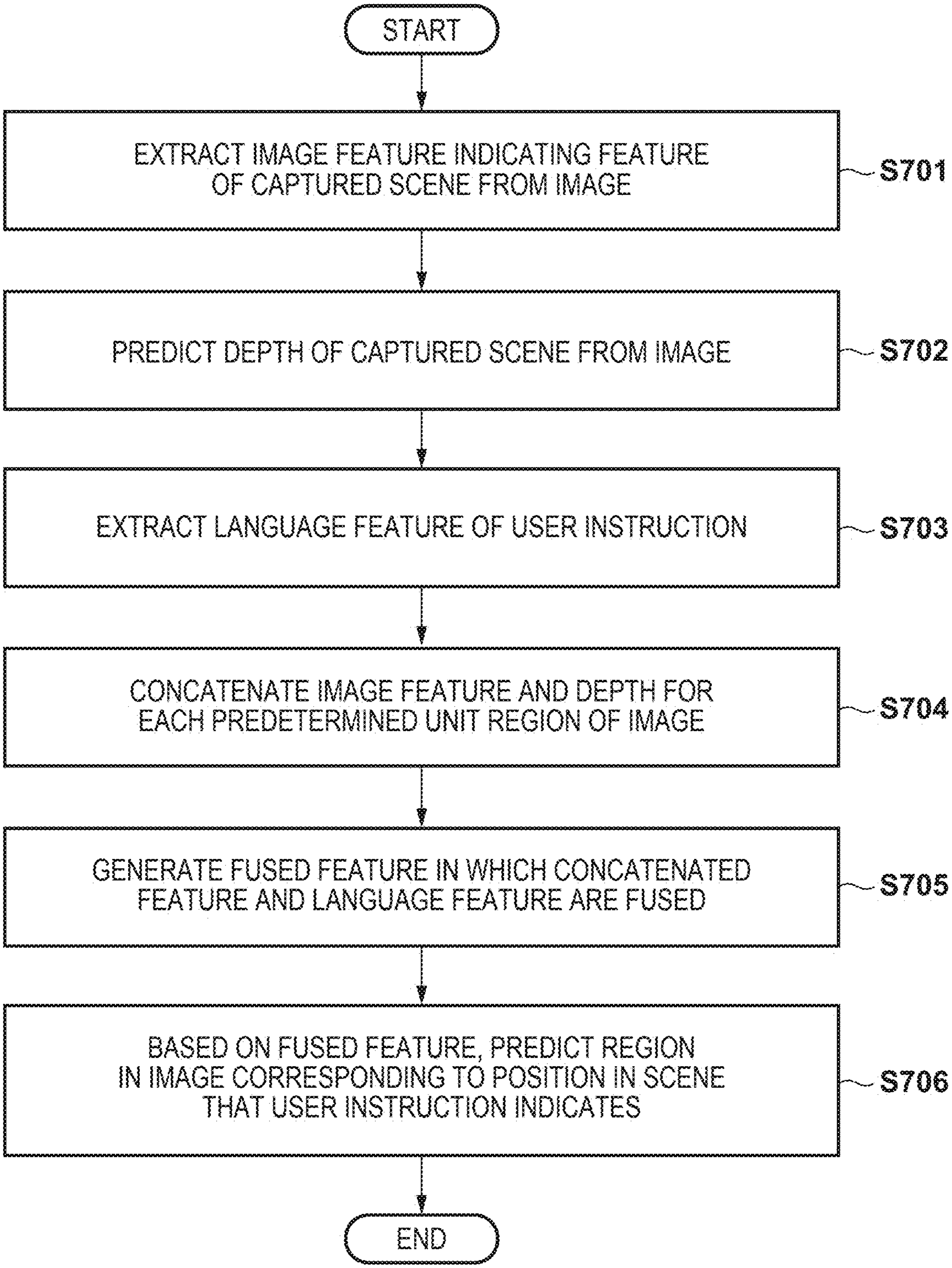
FIG. 7 is a flowchart illustrating a series of operations of the region prediction processing according to the embodiment.

Next, a series of operations in the region prediction processing will be described with reference to FIG. 7. Note that this processing is realized as the control unit 130 develops and executes the program stored in the storage device 135 on the memory device of the control unit 130. In addition, the information processing server may execute the program by one or more processors to realize the operation of the target region prediction unit 303. Note that the processing by the machine learning model illustrated in S701 to 706 uses the immediately preceding parameters changed in S606.

In S701, the image feature extraction unit 401 extracts, from the image acquired in S601, an image feature indicating a feature of a captured scene (that is, a feature of a target object, a traveling road, or the like in the captured image in RGB). For example, the image feature extraction unit 401 outputs the feature map $F_{img}$ in which the image feature is associated with each predetermined unit region (each region of H×W pixels) of the image.

In S702, the depth feature prediction unit 402 predicts a depth of the captured scene from the image acquired in S601. As described above, the depth feature prediction unit 402 outputs a feature of the depth, encoded from the image and then decoded by the machine learning model, as the depth map $F_{depth}$. In the depth map, for example, the depth is associated with each predetermined unit region (each region of H×W pixels). The predetermined unit region may be 1×1 pixel, but the operations in the region prediction processing can be speeded up when information on the depth is held for each predetermined unit region. In S703, the language feature extraction unit 403 extracts a language feature included in the user instruction acquired in S601.

In S704, the target region prediction unit 303 concatenates the feature map $F_{img}$ of the image and the depth map $F_{depth}$ to generate the concatenated map $F_{img+depth}$. For example, the target region prediction unit 303 concatenates the feature in the feature map $F_{img}$ of the image and the depth in the depth map $F_{depth}$ of the unit region at a corresponding position to generate the two-dimensional concatenated map.

In S705, the feature fusion unit 404 fuses a feature (the concatenated map $F_{img+depth}$) in which the feature of the image and the depth are concatenated with the language feature $F_{lang}$. As described above, the feature fusion unit 404 inputs the concatenated map ($F_{img+depth}$) as the query of the attention mechanism and inputs the language feature $F_{lang}$ as the key and the value of the attention mechanism by, for example, the PWAM, and generates the fused feature $F_{fusion}$ in which the language feature is fused to each unit region of the concatenated feature.

In S706, as described above, the prediction map generation unit 405 inputs the fused feature $F_{fusion}$ to the machine learning model and predicts a region in the image corresponding to a position in the scene indicated by the user instruction. When the predicted region in the image is output, the target region prediction unit 303 returns the processing to a caller.

<Series of Operations in Inference Stage of Machine Learning Model>

Figure 8:
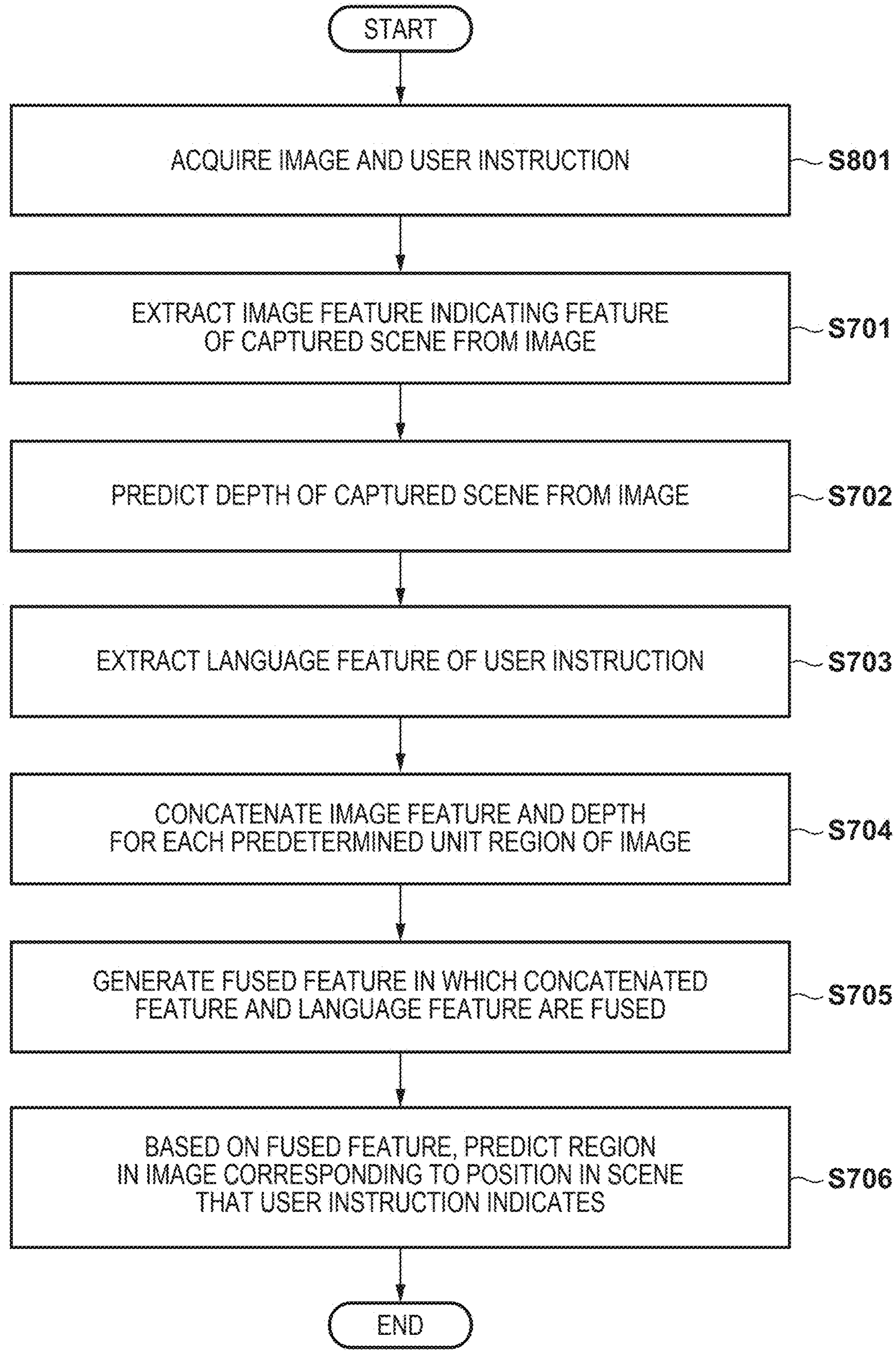
FIG. 8 is a flowchart illustrating a series of operations of an inference stage of the region prediction processing according to the embodiment.

Next, a series of operations in the inference stage of the machine learning model will be described with reference to FIG. 8. Note that this processing is realized as the control unit 130 develops and executes the program stored in the storage device 135 on the memory device of the control unit 130. Note that optimized parameters in a state where learning of the machine learning model is completed are used for the processing by the machine learning model illustrated in S701 to 706 in this series of operations.

In S801, for example, the instruction acquisition unit 301 acquires a user instruction input via the operation unit 131 or the voice input device 133 as language information (that is, information including designation of a place represented in a natural language). In addition, the image information acquisition unit 302 acquires an image from the detection unit 114.

In S701 to S706, as described above, the target region prediction unit 303 extracts an image feature, a depth, and a language feature by the machine learning model (the image feature extraction unit 401, the depth feature prediction unit 402, the language feature extraction unit 403, the feature fusion unit 404, and the prediction map generation unit 405), and fuses them to predict a specific region in the image corresponding to the user instruction. When a prediction map including the predicted region in the image is output, the target region prediction unit 303 ends the series of operations in the region prediction processing.

As described above, in the above-described embodiment, the region in the image corresponding to the position in the scene indicated by the user instruction is predicted based on the fused feature obtained by fusing the image feature indicating the feature of the scene captured in the image, the depth of the scene captured in the image, and the language feature indicating the linguistic feature related to the user instruction by using one or more machine learning models. In the present embodiment, the image feature and the depth are concatenated for each predetermined unit region of the image, so that the concatenated feature and the language feature can be easily fused. Since the language feature is fused with the concatenated feature for each predetermined unit region, it is possible to specify the position in the image having the image feature and the depth which are highly correlated with the language feature. That is, it is possible to perform highly accurate prediction in consideration of a relationship among the feature on the image, the depth, and the language feature. In other words, the prediction accuracy can be improved in the case of predicting the region on the image corresponding to the user instruction including the relative positional relationship.

Summary of Embodiment

The above-described embodiment includes an information processing apparatus, an information processing method, a generation method, a learning model, a program, and a storage medium described in the following items.

(Item 1)

A moving object control system comprising:

a memory (for example, 130); and one or more processors (for example, 130), wherein when instructions stored in the memory is executed by the one or more processors, the instructions cause the one or more processors to:

acquire an image (for example, 302);

acquire a user instruction in a natural language including a relative positional relationship (for example, 301); and predict a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models (for example, 303, S602).

According to this embodiment, prediction accuracy can be improved in the case of predicting the region on the image corresponding to the user instruction including the relative positional relationship.

(Item 2)

The moving object control system according to item 1, wherein instructions stored in the memory causes the one or more processors to predict a region in the image corresponding to a position in the scene indicated by the user instruction based on a fused feature obtained by fusing the image feature, the depth, and the language feature for each of predetermined unit regions of the image by using the one or more machine learning models (for example, 303).

According to this embodiment, since the image feature and the depth are concatenated for each of the predetermined unit regions of the image, the concatenated feature and the language feature can be easily fused.

(Item 3)

The moving object control system according to item 1, wherein instructions stored in the memory causes the one or more processors to:

by using the one or more machine learning models, extract, from the image, an image feature indicating a feature of a scene captured in the image (for example, 401);

predict, from the image, a depth of the scene captured in the image (for example, 402);

extract a language feature indicating a linguistic feature related to the user instruction (for example, 403); and predict a region in the image corresponding to a position in the scene indicated by the user instruction based on a fused feature obtained by fusing the image feature, the depth, and the language feature (for example, 405).

According to this embodiment, it is possible to perform highly accurate prediction by executing the extraction of the image feature, the prediction of the depth, the extraction of the language feature, and the prediction of the region by using the machine learning model.

(Item 4)

The moving object control system according to item 2 or 3, wherein the instructions cause the one or more processors to concatenate the image feature and the depth for each of predetermined unit regions of the image, and fuse the language feature to the concatenated feature for each of the predetermined unit regions to generate the fused feature by using the one or more machine learning models (for example, 404).

According to this embodiment, since the language feature is fused with the concatenated feature for each of the predetermined unit regions, it is possible to specify the position in the image having the image feature and the depth which are highly correlated with the language feature.

(Item 5)

The moving object control system according to item 4, wherein the one or more machine learning models further include a pixel-wise attention mechanism (PWAM) that fuses the language feature with the concatenated feature for each of the predetermined unit regions.

According to this embodiment, it is possible to accurately specify the image feature and the depth which are highly correlated with the language feature.

(Item 6)

A moving object control system comprising one or more processors configured to execute processing of one or more machine learning models, wherein the one or more machine learning models include a first machine learning model that extracts, from an acquired image, an image feature indicating a feature of a scene captured in the image (for example, 401), a second machine learning model that predicts, from the image, a depth of the scene captured in the image (for example, 402), a third machine learning model that extracts a language feature indicating a linguistic feature for a user instruction in a natural language including a relative positional relationship (for example, 403), and a fourth machine learning model that predicts a region in the image corresponding to a position in the scene indicated by the user instruction based on a fused feature obtained by fusing the image feature, the depth, and the language feature (for example, 405).

According to this embodiment, the prediction accuracy can be improved in the case of predicting the region on the image corresponding to the user instruction including the relative positional relationship.

(Item 7)

An information processing apparatus configured to cause one or more machine learning models to be trained, the information processing apparatus comprising:

a memory; and one or more processors, wherein when instructions stored in the memory is executed by the one or more processors, the instructions cause the one or more processors to perform:

acquiring an image, a user instruction in a natural language including a relative positional relationship, and correct answer data indicating a region in the image indicated by the user instruction (for example, 301, 302);

predicting a region, indicated by the user instruction, in the image corresponding to a position in a scene captured in the image based on the image and the user instruction by using the one or more machine learning models (for example, 303); and causing the one or more machine learning models to be trained by using a loss function based on a difference between the predicted region in the image and the region in the image indicated by the correct answer data (for example, 304), and the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction.

According to this embodiment, the prediction accuracy can be improved in the case of predicting the region on the image corresponding to the user instruction including the relative positional relationship.

(Item 8)

The information processing apparatus according to item 7, wherein the loss function includes a function that calculates a binary cross-entropy loss.

According to this embodiment, it is possible to speed up the processing by performing the two-class classification.

(Item 9)

The information processing apparatus according to item 7 or 8, wherein the causing the one or more machine learning models to be trained includes using the loss function obtained by calculating the difference between the predicted region in the image and the region in the image indicated by the user instruction indicated by the correct answer data in a lower half region of the region of the image.

According to this embodiment, it is possible to speed up the processing by limiting the target for which the loss function is calculated.

(Item 10)

An information processing apparatus configured to cause one or more machine learning models to be trained, the information processing apparatus comprising:

a memory; and one or more processors, wherein when instructions stored in the memory is executed by the one or more processors, the instructions cause the one or more processors to perform:

acquiring an image, a user instruction in a natural language including a relative positional relationship, and correct answer data indicating a region in the image indicated by the user instruction (for example, 301, 302);

predicting a region, indicated by the user instruction, in the image corresponding to a position in a scene captured in the image based on the image and the user instruction by using the one or more machine learning models (for example, 303); and causing the one or more machine learning models to be trained by using a loss function based on a difference between the predicted region in the image and the region in the image indicated by the user instruction indicated by the correct answer data (for example, 304), and the one or more machine learning models include a first machine learning model (for example, 401) that extracts an image feature indicating a feature of the scene captured in the image from the acquired image, a second machine learning model (for example, 402) that predicts a depth of the scene captured in the image from the image, a third machine learning model (for example, 403) that extracts a language feature indicating a linguistic feature for the user instruction, and a fourth machine learning model (for example, 404) that predicts the region in the image corresponding to the position in the scene indicated by the user instruction based on a fused feature obtained by fusing the image feature, the depth, and the language feature.

According to this embodiment, the prediction accuracy can be improved in the case of predicting the region on the image corresponding to the user instruction including the relative positional relationship.

(Item 11)

A method executed in a moving object control system, the method comprising:

acquiring an image;

acquiring a user instruction in a natural language including a relative positional relationship; and predicting a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models.

According to this embodiment, the prediction accuracy can be improved in the case of predicting the region on the image corresponding to the user instruction including the relative positional relationship.

(Item 12)

A method for generating one or more machine learning models, the method being executed in an information processing apparatus, the method comprising:

acquiring an image, a user instruction in a natural language including a relative positional relationship, and correct answer data indicating a region in the image indicated by the user instruction;

predicting a region, indicated by the user instruction, in the image corresponding to a position in a scene captured in the image based on the image and the user instruction by using the one or more machine learning models; and causing the one or more machine learning models to be trained by using a loss function based on a difference between the predicted region in the image and the region in the image indicated by the user instruction indicated by the correct answer data, wherein the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction.

According to this embodiment, the prediction accuracy can be improved in the case of predicting the region on the image corresponding to the user instruction including the relative positional relationship.

The invention is not limited to the foregoing embodiments, and various variations/changes are possible within the spirit of the invention.

What is claimed is:

1. A moving object control system comprising:

a memory; and one or more processors, wherein when instructions stored in the memory are executed by the one or more processors, the instructions cause the one or more processors to:

acquire an image;

acquire a user instruction in a natural language including a relative positional relationship; and predict a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models, wherein the instructions further cause the one or more processors to:

extract, from the image, a feature map in which the image feature is associated with each of predetermined unit regions of the image;

predict, from the image, a depth map in which the depth is associated with each of the predetermined unit regions of the image;

extract the language feature related to the user instruction;

concatenate the feature map and the depth map to generate a concatenated map;

by using a pixel-wise attention mechanism (PWAM), receive the concatenated map as a query of an attention mechanism and receive the language feature as a key and a value of the attention mechanism to generate the fused feature in which the language feature is fused to each of the predetermined unit regions; and input the fused feature to a transformer decoder to output a prediction map indicating, for each of regions of the image, a probability of being the position in the scene indicated by the user instruction, and predict the region in the image corresponding to the position in the scene indicated by the user instruction based on the prediction map.

2. An information processing apparatus configured to cause one or more machine learning models to be trained, the information processing apparatus comprising:

a memory; and one or more processors, wherein when instructions stored in the memory are executed by the one or more processors, the instructions cause the one or more processors to perform:

acquiring an image, a user instruction in a natural language including a relative positional relationship, and correct answer data indicating a region in the image indicated by the user instruction;

predicting a region, indicated by the user instruction, in the image corresponding to a position in a scene captured in the image based on the image and the user instruction by using the one or more machine learning models; and causing the one or more machine learning models to be trained by using a loss function based on a difference between the predicted region in the image and the region in the image indicated by the correct answer data, and the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction, wherein the instructions further cause the one or more processors to perform:

extracting, from the image, a feature map in which the image feature is associated with each of predetermined unit regions of the image;

predicting, from the image, a depth map in which the depth is associated with each of the predetermined unit regions of the image;

extracting the language feature related to the user instruction;

concatenating the feature map and the depth map to generate a concatenated map;

by using a pixel-wise attention mechanism (PWAM), receiving the concatenated map as a query of an attention mechanism and receiving the language feature as a key and a value of the attention mechanism to generate the fused feature in which the language feature is fused to each of the predetermined unit regions; and inputting the fused feature to a transformer decoder to output a prediction map indicating, for each of regions of the image, a probability of being the position in the scene indicated by the user instruction, and predicting the region in the image corresponding to the position in the scene indicated by the user instruction based on the prediction map.

3. The information processing apparatus according to claim 2, wherein the loss function includes a function that calculates a binary cross-entropy loss.

4. The information processing apparatus according to claim 2, wherein the causing the one or more machine learning models to be trained includes using the loss function obtained by calculating the difference between the predicted region in the image and the region in the image indicated by the user instruction indicated by the correct answer data in a lower half region of the region of the image.

5. A method executed in a moving object control system, the method comprising:

acquiring an image;

acquiring a user instruction in a natural language including a relative positional relationship; and predicting a region in the image corresponding to a position in a scene indicated by the user instruction based on a fused feature obtained by fusing an image feature indicating a feature of the scene captured in the image, a depth of the scene captured in the image, and a language feature indicating a linguistic feature related to the user instruction by using one or more machine learning models, wherein predicting the region in the image corresponding to the position in the scene indicated by the user instruction includes:

extracting, from the image, a feature map in which the image feature is associated with each of predetermined unit regions of the image;

predicting, from the image, a depth map in which the depth is associated with each of the predetermined unit regions of the image;

extracting the language feature related to the user instruction;

concatenating the feature map and the depth map to generate a concatenated map;

by using a pixel-wise attention mechanism (PWAM), receiving the concatenated map as a query of an attention mechanism and receiving the language feature as a key and a value of the attention mechanism to generate the fused feature in which the language feature is fused to each of the predetermined unit regions; and inputting the fused feature to a transformer decoder to output a prediction map indicating, for each of regions of the image, a probability of being the position in the scene indicated by the user instruction, and predicting the region in the image corresponding to the position in the scene indicated by the user instruction based on the prediction map.

6. A method for generating one or more machine learning models, the method being executed in an information processing apparatus, the method comprising:

acquiring an image, a user instruction in a natural language including a relative positional relationship, and correct answer data indicating a region in the image indicated by the user instruction;

predicting a region, indicated by the user instruction, in the image corresponding to a position in a scene captured in the image based on the image and the user instruction by using the one or more machine learning models; and causing the one or more machine learning models to be trained by using a loss function based on a difference between the predicted region in the image and the region in the image indicated by the user instruction indicated by the correct answer data, wherein the one or more machine learning models predict the region in the image corresponding to the position in the scene indicated by the user instruction based on a fused feature obtained by fusing an image feature indicating a feature of the scene captured in the image, a depth of the scene captured in the image, and a language feature indicating a linguistic feature related to the user instruction, wherein predicting the region in the image corresponding to the position in the scene includes:

extracting, from the image, a feature map in which the image feature is associated with each of predetermined unit regions of the image;

predicting, from the image, a depth map in which the depth is associated with each of the predetermined unit regions of the image;

extracting the language feature related to the user instruction;

concatenating the feature map and the depth map to generate a concatenated map;

by using a pixel-wise attention mechanism (PWAM), receiving the concatenated map as a query of an attention mechanism and receiving the language feature as a key and a value of the attention mechanism to generate the fused feature in which the language feature is fused to each of the predetermined unit regions; and inputting the fused feature to a transformer decoder to output a prediction map indicating, for each of regions of the image, a probability of being the position in the scene indicated by the user instruction, and predicting the region in the image corresponding to the position in the scene indicated by the user instruction based on the prediction map.

* * * * *